May 15, 1934.    B. E. BALDUF    1,958,778
RESILIENT MACHINERY BASE
Filed June 20, 1931    6 Sheets-Sheet 1

INVENTOR
BRUNO E. BALDUF.
BY
ATTORNEY

May 15, 1934.  B. E. BALDUF  1,958,778
RESILIENT MACHINERY BASE
Filed June 20, 1931   6 Sheets-Sheet 2

INVENTOR
BRUNO E. BALDUF
BY
ATTORNEY

May 15, 1934.  B. E. BALDUF  1,958,778
RESILIENT MACHINERY BASE
Filed June 20, 1931  6 Sheets-Sheet 3

INVENTOR
BRUNO E. BALDUF.
BY
ATTORNEY

May 15, 1934.  B. E. BALDUF  1,958,778
RESILIENT MACHINERY BASE
Filed June 20, 1931  6 Sheets-Sheet 4

INVENTOR
BRUNO E. BALDUF
BY
ATTORNEY

May 15, 1934. B. E. BALDUF 1,958,778
RESILIENT MACHINERY BASE
Filed June 20, 1931 6 Sheets-Sheet 5

INVENTOR
BRUNO E. BALDUF
BY
ATTORNEY

May 15, 1934.   B. E. BALDUF   1,958,778
RESILIENT MACHINERY BASE
Filed June 20, 1931   6 Sheets-Sheet 6

INVENTOR
BRUNO E. BALDUF.
BY
ATTORNEY

Patented May 15, 1934

1,958,778

UNITED STATES PATENT OFFICE 1,958,778

RESILIENT MACHINERY BASE

Bruno E. Balduf, Chicago, Ill., assignor to United States Gypsum Company, Chicago, Ill., a corporation of Illinois Application June 20, 1931, Serial No. 545,707

14 Claims. (Cl. 248—16)

This invention relates to resilient, sound insulating machinery bases, floors, etc. and has reference more particularly to spring supported bases adapted to sound insulate moving machinery or other vibrating parts from a building in which the machinery is operating or from the structural parts supporting said machinery.

In my application for patent, Serial No. 340,121, filed February 15, 1929, to issue as Patent 1,811,250 on June 23, 1931, I have described a type of spring clip adapted for sound insulating structures. In the present application I will disclose various additional applications of this spring clip for use not only for sound insulation, but also for preventing the transmission of vibration from moving machinery to buildings in which they are operating or to other supporting parts. I will also disclose various combinations and modifications which may be employed to give to this type of spring, its maximum usefulness.

Reference is to be had to the accompanying drawings forming a part of this specification, in which.

Figure 3:
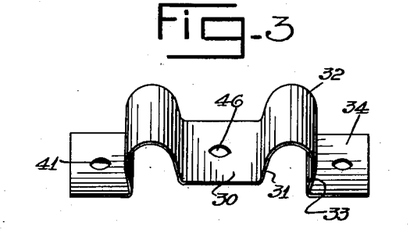
Fig. 3 is a perspective view of one of my improved spring clips.

In practical application, I apply spring clips in their simplest form which may consist of a saddle member 30, connected by arms 31, which preferably taper upwardly at a slight angle to the vertical. The arms 31 are integrally connected with flexible, arcuate spring loops 32, which in turn are connected to downwardly extending legs 33, which also preferably slope at a slight angle to the vertical, said legs terminating in outstanding clip ends 34 which lie in a plane different and parallel to that of the saddle member 30. These spring clips are preferably made of crucible, annealed steel, containing approximately 0.77% carbon and tempered to a scleroscopic hardness of 60. The spring clip is formed into shape while in a soft state by dies or other suitable tools. After forming, they are heated up to a temperature of about 1440° F. to anneal the same, and are then quenched in oil. The next heat treatment is to draw the clips in liquid saltpeter at a temperature of about 675° F., after which the clips are cooled in air and are washed in boiling water. The clips may be used in various gauges such as 12–28 gauge, depending upon the strength desired and the design of the particular machinery base to be used.

Figure 1:
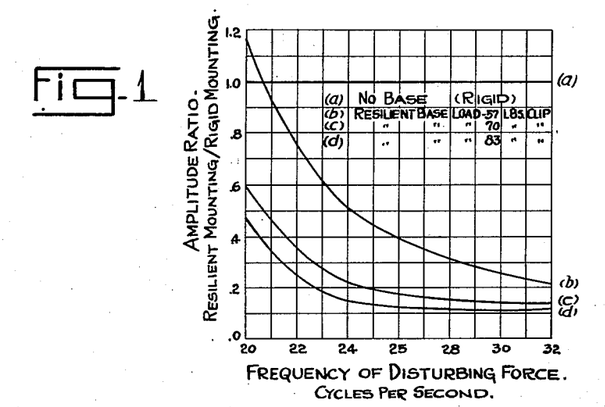
Figs. 1 and 1A are graphical charts showing experimental curves derived by dynamical methods showing the relation of the amplitude ratio of 20 gauge spring clips to the frequency of the disturbing force and the load carried by each clip.
Figure 1A:
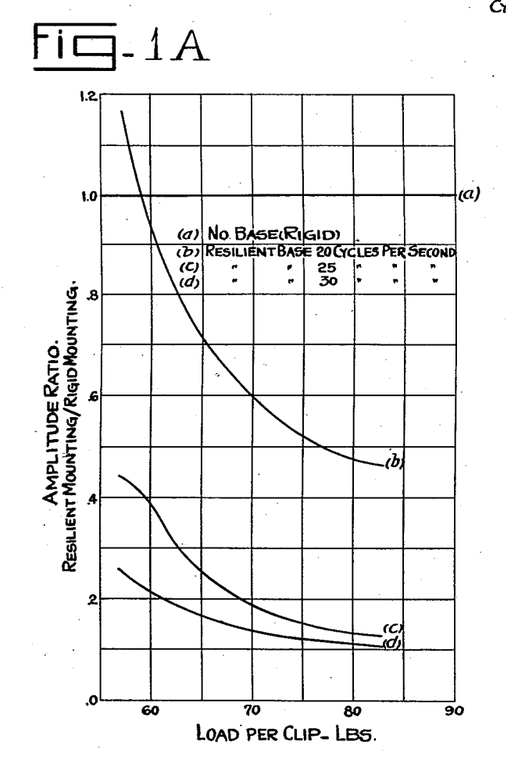

In practice the resilient clips are so proportioned as to loading and stiffness that the frequency of free vibration of the machine on its resilient mounting is of the order of one third to one tenth that of the lowest frequency disturbing force in the machine. If $w_1$ and $w_2$ are, respectively, the frequency of the disturbing force in question and the frequency of free vibration of the machine on its resilient mounting, it may be demonstrated analytically and experimentally that the amplitude of vibration of the supporting structure by the resiliently mounted machine will be reduced to the fraction $$\frac{1}{1-\left(\frac{w_1}{w_2}\right)^2}$$

of the amplitude which would result if the machine were mounted rigidly to the structure. The appended curves Fig. 1 and 1A present experimental determinations of this reduction in vibration amplitude as it varies with disturbing frequency and loading of the clip. These data were obtained on 20 gauge resilient clips proportioned to isolate vibration frequencies of the order of 30 cycles/second, such as would be set up in an unbalanced machine running at 1800 revolutions per minute.

Figure 2:
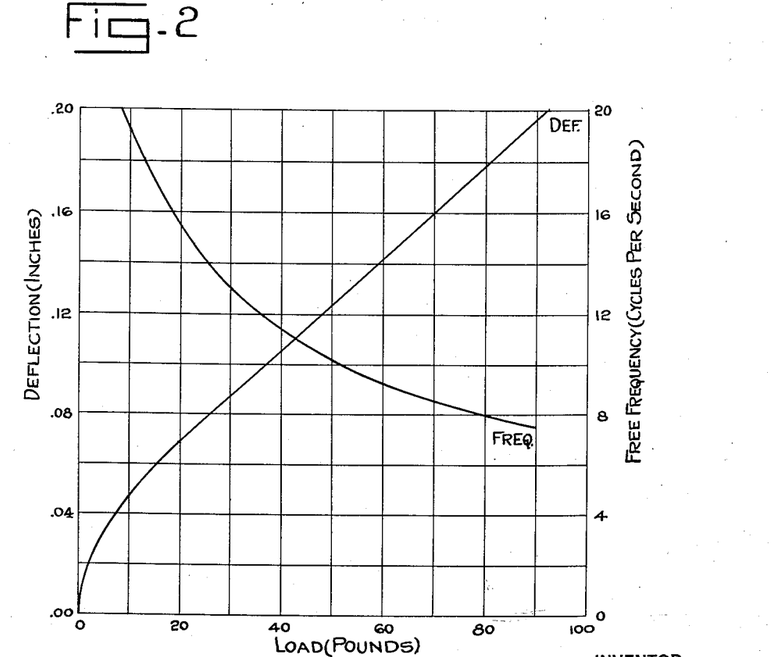
Fig. 2 is a graphical chart showing an experimental curve derived by static methods showing the relation between the load on a 20 gauge spring clip and deflection, together with a curve determined mathematically showing the relation between the load on the spring and its natural frequency.

The curves in Fig. 2 present the experimentally determined load-deflection data on this 20 gauge clip together with the free vibration frequencies, as calculated from these data, of a machine mounted on the clips at various loads per clip. These curves in Figs. 1 and 1A were obtained by the use of a machine base supported on the spring clips and vibrated by a variable speed excentrically loaded motor.

Figure 2A:
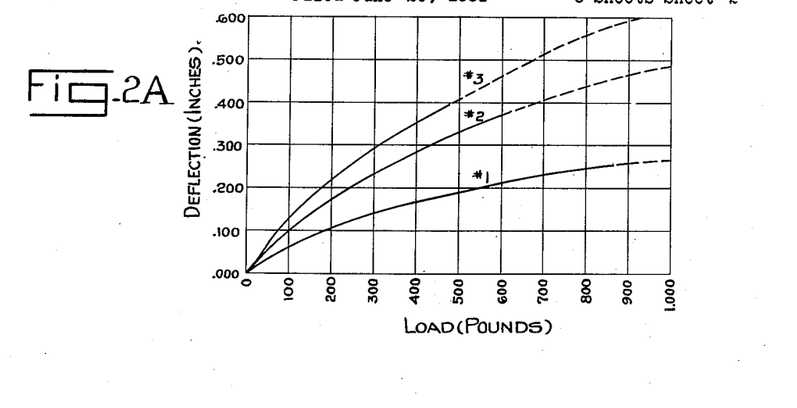
Fig. 2A is a graphical chart showing load deflection curves on a 20 gauge two leaf spring clip and each of its leaves, obtained by static methods.

The curves in Fig. 2A present experimentally determined load-deflection data on a 16 gauge two leaf spring clip, curve No. 1 applying to the combined leaves, No. 2 to the inner leaf alone, and No. 3 to the outer leaf alone. The difference in the curves for each of the two leaves acting alone is due to the difference in radius of the resilient loops making a difference in stiffness.

Obviously the proportions of the resilient clip may be varied over a wide range in order to obtain load bearing and free vibration characteristics suitable to different types of work.

Figure 4:
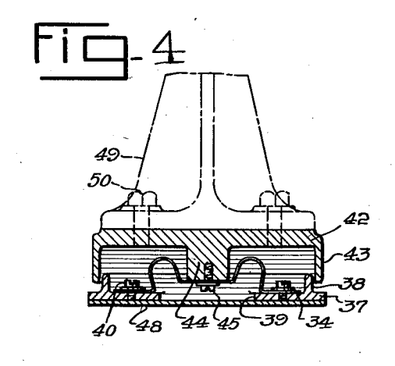
Fig. 4 is a sectional elevation through a machine base or unit for use in supporting machinery of all kinds.
Figure 5:
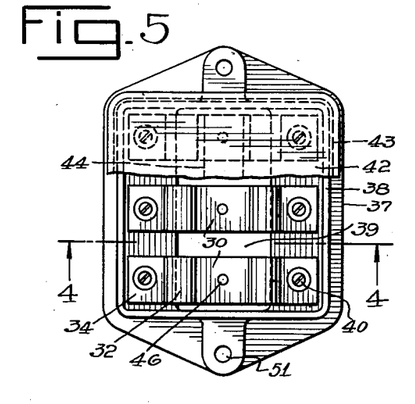
Fig. 5 is a plan view of the machinery base shown in Fig. 4 with parts broken away to disclose the construction.

In utilizing the spring clips for bases to be used for supporting vibrating machinery, I prefer to form a cast box 37, having upstanding sides 38, and a central opening 39. Screws 40 pass through holes 41 formed in the clip ends 34, and are tapped into the box 37, with the clip spanning the opening 39. A machinery base cover 42, is provided with downwardly extending sides 43, telescoping over the outside of the box sides 38, and is also provided with a downwardly extending central rib 44 for receiving a row of the saddle members 30. Screws 45 pass through central openings 46 in the saddle members 30, and serve to attach said saddle members to the rib 44. The screw 45 may be tightened through the opening 39, and thereafter a plate 48 may be applied by screws or otherwise to the lower face of the box 37, to close the opening 39. The plate 48 will rest directly upon any suitable foundation such as the masonry floors of a building. The frame work 49, of any machine having moving parts, rests directly upon the cover 42, being secured thereto by means of bolts 50. Suitable openings 51, may be provided in the box 37 and plate 48 for attaching the unit or resilient machinery base to the floor of the building.

Figure 6:
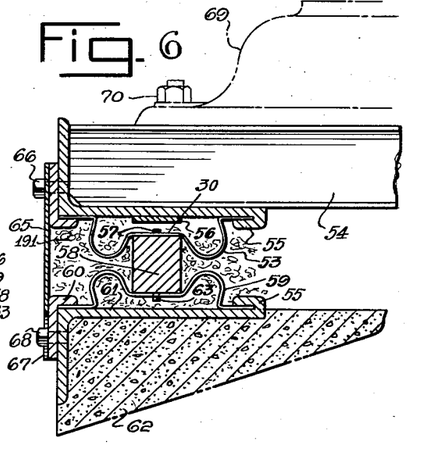
Fig. 6 is a sectional elevation through a modified form of construction utilizing the progressive action of springs of different thickness and stiffness.
Figure 7:
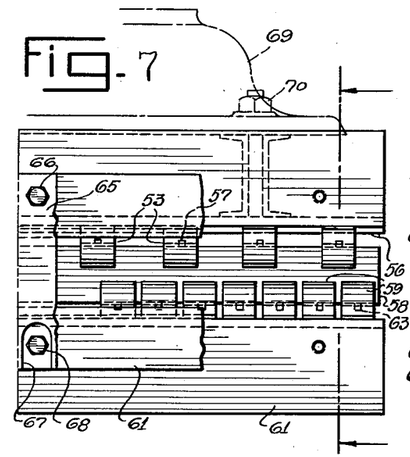
Fig. 7 is an elevation of the resilient machinery base construction shown in Fig. 6 with parts broken away to disclose the construction.

With some types of machinery, such as elevator hoisting machines, there is a wide variation in load applied to the spring clips due to starting and stopping, acceleration and retardation, and a difference in the number of passengers or amount of freight carried. My resilient spring clips perform to best advantage when properly loaded, and the range of loadings at which the clips will work best is comparatively small. In such cases, I provide two or more spring clips arranged as shown in Figs. 6 and 7, so as to act progressively, said clips preferably but not necessarily being of different gauge metal. The light gauge metal clip 53, is preferably arranged immediately under the elevator machinery base 54 with its ends retained under suitable flanges 55 associated with said base.

A stop plate 56 is secured to the lower face of the base 54, and is so arranged when the clip 53 is fully loaded and deflected to its limit, to engage with a lead or other type of stop washer 57. A block 58 is secured to the saddle 30 of the clip 53, and to the saddle of a lower clip 59 made of heavier gauge metal than the clip 53. The ends of the clip 59 are also retained under suitable flanges 60 connected to a supporting angle framework 61, which is embedded in a masonry foundation 62. Thus under heavy loads, the stop plate 56 engages with the stop washer 57 and causes spring 59 to deflect, the deflection of the latter being limited by a lead stop washer 63 which is arranged to engage the angle frame 61 and prevent the deflection of spring 59 beyond its elastic limit. The clips 53 and 59 may be arranged around the periphery of the framework 54 and may be protected from dust and dirt by a plate 65 secured by bolts 66 to the framework 54, said plates being provided with slots 67 loosely sliding on guide bolts 68. The elevator machinery 69 is secured to the base framework 54 by means of bolts 70.

When the spring clips shown in Fig. 3 are made of about 20 gauge metal, their safe load carrying capacity is about 50 pounds per clip. As not more than 16 of the clips can be placed upon one square foot of area at the very most, a maximum unit load of not over 800 pounds per square foot can be safely carried by this type of clip. In many instances, however, in connection with heavy printing machinery, elevator machinery, gas engines, compressors, etc., weighing up to 50 tons or more, the available floor space is so limited that the application of single leaf spring clips becomes impractical. Making a spring clip of heavier gauge material would, of course, tend to increase its load carrying capacity, but tests have shown that from a sound and vibration insulating standpoint, said spring clips are more or less inefficient.

Figure 8:
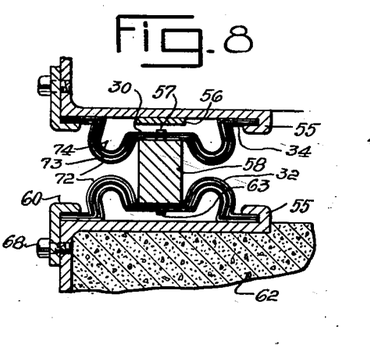
Fig. 8 is a sectional elevation through a further modified construction, showing the application of the progressive action of multiple leaf springs.

For this reason, I sometimes find it desirable to use multiple leaf spring clips as shown in Fig. 8, these clips being preferably spot welded together at their saddles 30 and at their ends 34. The different leaves of a multiple leaf clip have the radius of their spring loops 32 differing, so that said loops are out of frictional contact one with the other, so as to cause them to work independently of each other and to also eliminate the necessity of oiling the springs between the leaves. The different leaves of the spring may be all of the same gauge metal, or may be of different gauge, depending upon the type of construction desired. As seen from Fig. 1, the smaller the radius of the loop 32, the stiffer the spring will be and the less the deflection produced by given loads. Thus the inner spring with the smaller radius of the loop 32 will be stiffer than the outer spring with a larger radius on the loop. Since the natural frequency of the spring clip is a function of the load and deflection, said natural frequency can be adjusted to any desired value by using springs of predetermined gauge and radius of the loops 32. As seen in Fig. 8, the multiple leaf spring thus consists of three leaves 72, 73 and 74, which may be substituted for the single spring clips 53 and 59 shown in the construction of Fig. 6. It is obvious that these multiple leaf springs may also be substituted in any of the machine bases herein described as desired to suit design conditions.

Figure 9:
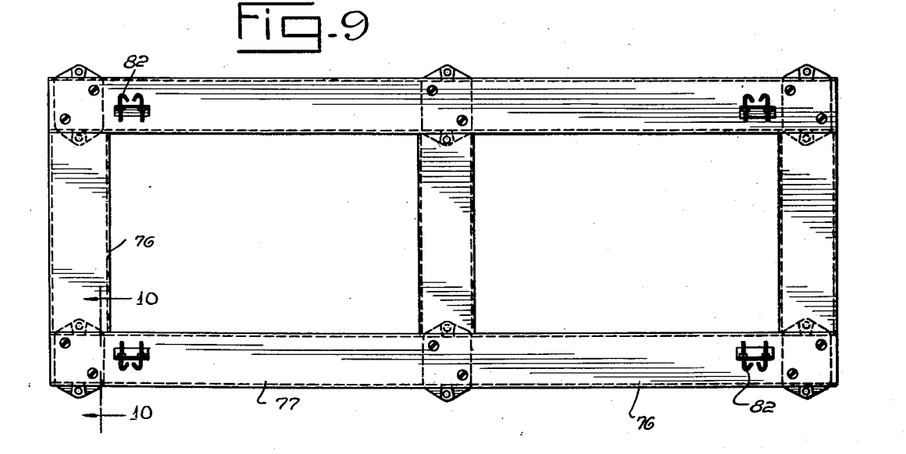
Fig. 9 is a plan view of a frame work for receiving the resilient units and forming a support for vibrating machinery.
Figure 10:
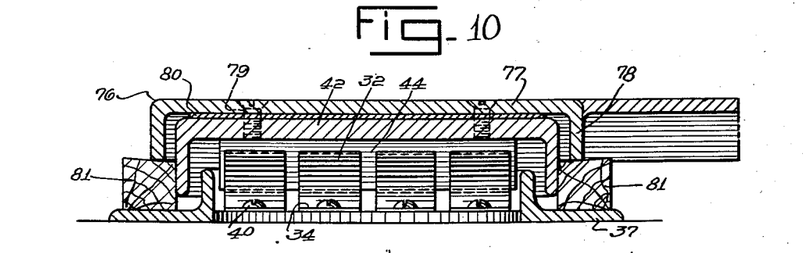
Fig. 10 is a sectional elevation through the construction shown in Fig. 9 taken on 10—10 thereof.

If a machine having a considerable floor area and low weight is to be provided with a resilient base, several of the resilient units shown in Fig. 5 may be used and connected by suitable structural members, such as channels 76, having webs 77 and downwardly extending flanges 78. The cast cover 42 and the balance of the unit shown in Figs. 4 and 5 are placed under the channel web 77, being secured thereto by means of screws 79, a layer of plastic material 80, such as asphalt emulsion, being preferably placed between the cover 42 and web 77. The channels 76 are preferably welded together, or otherwise secured, end to end to form the framework as shown in Fig. 9 which is in the form of a rectangle, square or any other closed figure desired with the flat spring clips arranged around the periphery thereof. Removable wooden blocks 81 may be placed between the lower edges of channel legs 78 and the box 37 during shipment of the resilient base structure to prevent the spring clips from being unduly deflected by the application of some external force. Suitable hook bolts 82 may be provided on top of the channel web 77 for attaching the machine to said channels 76.

Figure 11:
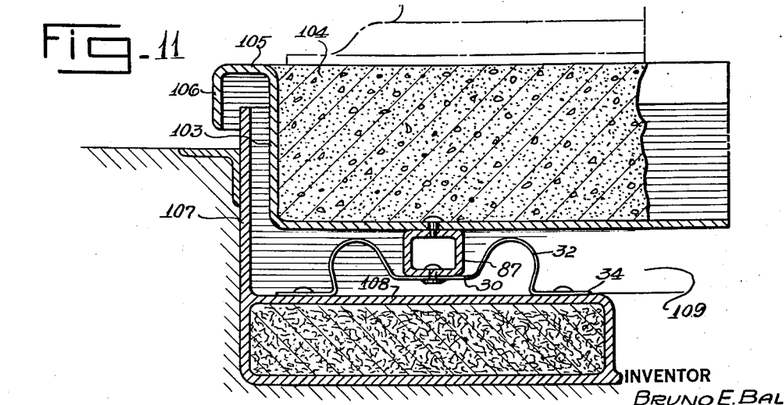
Fig. 11 is a sectional elevation through a further modified form of construction in which a load in addition to the machine is added to the spring clips.
Figure 12:
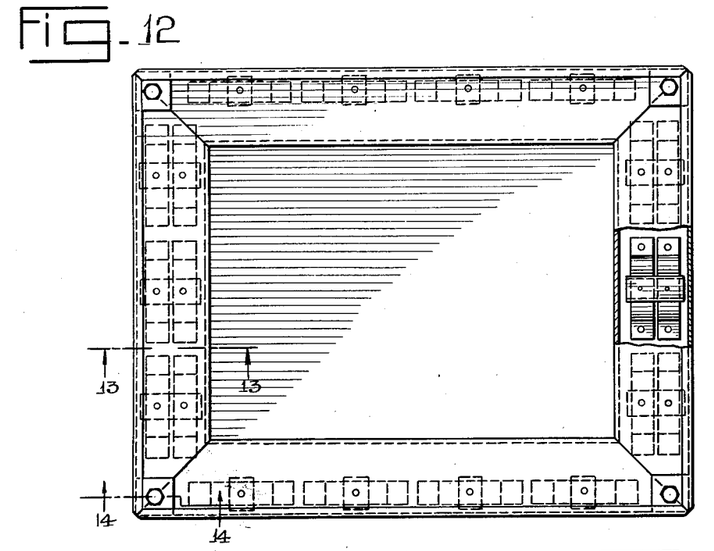
Fig. 12 is a plan view of another type of machinery base with the spring clips arranged around the periphery thereof and with a masonry slab supported by the clips.
Figure 13:
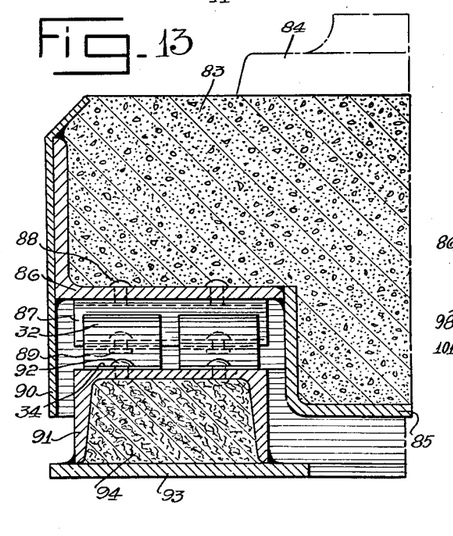
Fig. 13 is a sectional elevation taken on line 13—13 of Fig. 12.

For some types of machine which have a considerable vibration of known frequency, but the machine itself is of comparatively light weight, it is desirable to place an additional load upon the springs by means of a masonry slab 83 which provides a platform for the machine and upon which the machine 84 stands. The slab 83 may be formed inside of a metal box or receptacle 85 as shown in Fig. 13, one part of which may consist of an angle member 86, to which may be secured a hollow rail, spacer or rib 87 as seen in Figs. 11 and 13. Rivets 88 may be used for securing the rail 87 to the angle member 86, and the rail 87 may be secured to the saddle member 30 by means of rivets 89. A skirting wall 90, extends downwardly from angle 86 past the spring clips to protect the same, and said wall 90 overlaps an inverted channel 91 to which the clip ends 34 are secured, as by rivets 92. The channel 91 may have its downwardly extending legs welded to a base plate 93 and the space between said plate and said channel member may be filled with masonry or other cementitious material 94, if desired. It will be noted that the bottom of box 85 extends downwardly between the channels 91 so as to lower the center of gravity of the masonry slab and thus increase the efficiency of the machine base. The angle member 86 may be in rectangular form as shown in Fig. 12 with all of the intermediate space filled with the masonry block 83 for supporting the machine 84. It will be seen from an inspection of Fig. 12, that the flat spring clips are arranged in the form of a rectangle, square or other closed figure and some of the spring clips are positioned at right angles to other spring clips. By this right angled arrangement, substantially all horizontal movement of the machine base is prevented and only the vertical component of the vibration can cause movement of the machine base. This arrangement is especially effective in isolating machinery having massive, moving parts where there is a decided tendency for the machine to "gallop" on its supporting springs. The arrangement of the spring clips around the periphery of the machine platform is especially effective in preventing rocking of the vibrating machine but spring clips placed in the center of the platform are not effective.

Figure 14:
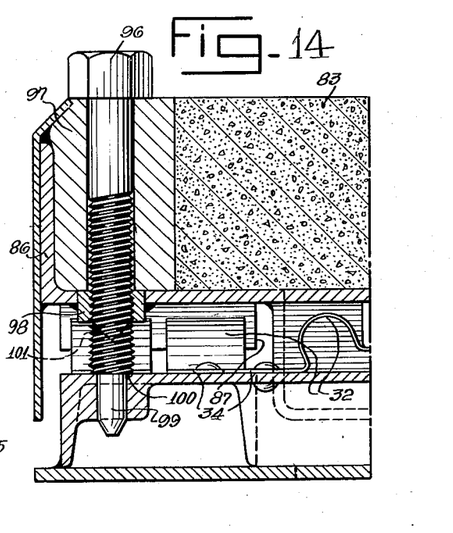
Fig. 14 is a sectional view taken on line 14—14 of Fig. 12.

During shipment of the resilient machine base shown in Figs. 12, 13 and 14, especially when the machine 84 is in position on the base 83, it is desirable to prevent the vibration of the spring clips to prevent them from being deflected beyond their elastic limit. For this purpose, I provide a bolt 96 which passes downwardly through a metallic block 97 attached to the angle frame member 86, and is threaded into a nut 98 welded to said angle member. An unthreaded spindle 99 on the lower end of bolt 96 passes through the web of the channel base 91, and is provided with a shoulder 100 for engaging the top of said web and preventing the downward deflection of the spring clips. When the base is in operation, the long bolt 96 is removed and a shorter bolt 101 is substituted in its place merely for the purpose of filling up the bolt hole.

In the resilient base shown in Fig. 11, the shell 103 for supporting the masonry base 104 has an outwardly extending flange 105 and a downwardly extending flange 106 which is telescoped outside of an upwardly extending plate 107 connected to a spring clip supporting base 108. The plate 107 provides a curb to prevent any water from washing down into the recess or pit 109, in which are positioned the spring clips.

Figures 15, 16, 17:
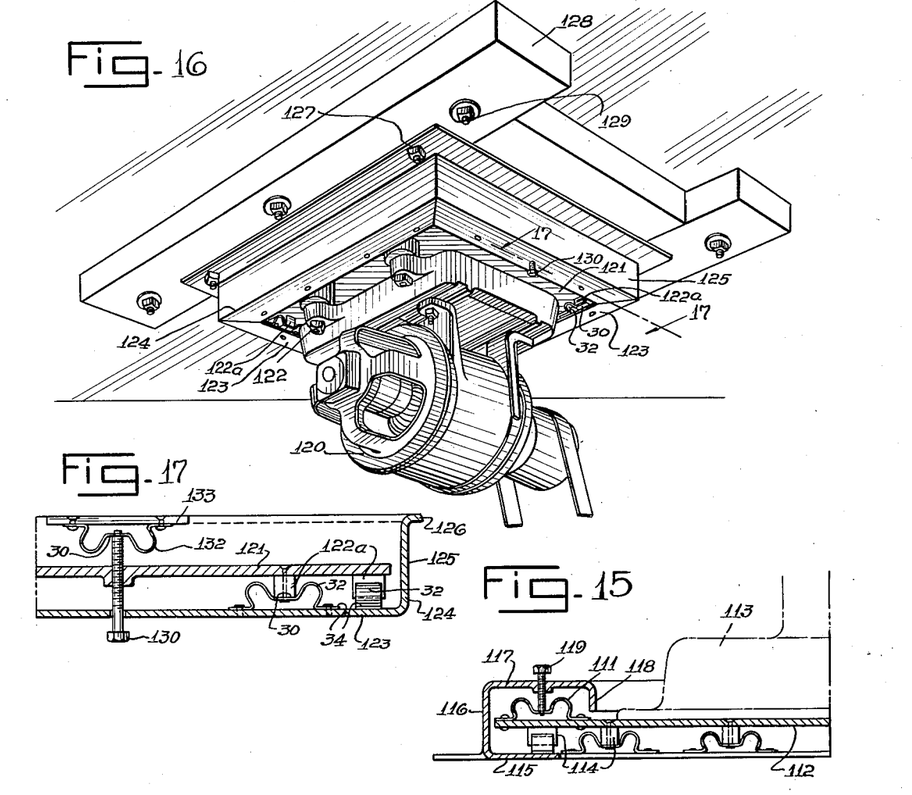
Fig. 15 is a sectional elevation through a further modified form of construction, in which additional weight is placed on the main supporting spring clips by the means of auxiliary spring clips.
Fig. 16 is a perspective view of a suspended motor support embodying my spring clips.
Fig. 17 is a sectional elevation taken on line 17—17 of Fig. 16.

Instead of utilizing a masonry slab of considerable weight to furnish a load on the main spring clips in addition to the weight of the machine itself, and thus cause the spring clips to operate at maximum efficiency, I sometimes find it desirable to utilize auxiliary spring clips 111 which have their outstanding ends secured, as by riveting, to a plate 112 on which the machine 113 rests. Bars or blocks 114 are secured to the lower face of plate 112 and rest upon and are secured to the saddle members 30 of the spring clips. The outstanding ends of the spring clips are secured to a bottom plate 115 which has an upwardly extending wall 116 and an inwardly extending flange 117 terminating in a downwardly extending flange 118. An adjustment screw 119 is threaded into the flange 117 and has its lower end shouldered to bear against the saddle 30 of the auxiliary spring clip 111. By adjusting the screw 119, any desired pressure may be applied to the clip 111 and thus to the main spring clips supporting said plate. These auxiliary spring clips may be used in any of the resilient bases herein described if desired.

By suitable modification, my resilient machinery base may be used for suspended machinery, such as an electric motor 120 suspended from the ceiling of a room. This motor is attached to a plate 121 by means of bolts 122, or other suitable means, and said plate is supported around its periphery on blocks or bars 122a which rest upon and are secured to the saddle members 30 spaced, parallel members, one of which is adapted to constitute a fixed support, and the other to have a machine rigidly secured thereto, and a plurality of resilient supporting units interposed between said spaced, parallel members; each of said resilient supporting units comprising at least two, substantially U-shaped flat spring members having parts respectively secured to said spaced, parallel members, said spring members forming closed spring loops having axes inclined to the planes of said spaced, parallel members and offering stiff resistance to movement between said spaced, parallel members in a direction transversely of said U-shaped members, but permitting resilient movement between said members toward and away from each other.

10. A resilient machinery base comprising two spaced, parallel members, one of which is adapted to constitute a fixed support, and the other to have a machine rigidly secured thereto, a plurality of resilient supporting units interposed between said spaced, parallel members with several units spaced at short intervals along two opposite edges of said members, each of said resilient supporting units comprising at least two, substantially U-shaped, flat spring members having parts respectively secured to said spaced, parallel members, said spring members forming closed spring loops having axes inclined to the planes of said spaced, parallel members and offering stiff resistance to movement between said spaced, parallel members in a direction transversely of said U-shaped members, but permitting resilient movement between said members toward and away from each other.

11. A resilient machinery base comprising two spaced, parallel members, one of which is adapted to constitute a fixed support, and the other of which comprises a platform member of relatively great mass adapted to have a machine rigidly secured thereto, and a plurality of resilient supporting units interposed between said spaced, parallel members, each of said resilient supporting units comprising at least two, substantially U-shaped flat spring members having parts respectively secured to said spaced, parallel members, said spring members forming closed spring loops offering stiff resistance to movement between said spaced, parallel members in a direction transversely of said U-shaped members, but permitting resilient movement between said members toward and away from each other.

12. A resilient machinery base comprising two spaced, parallel members, one of which is adapted to constitute a fixed support, and the other to have a machine suspended therefrom in rigidly secured relation thereto, and a plurality of resilient supporting units interposed between said spaced, parallel members, each of said resilient supporting units comprising at least two, substantially U-shaped flat spring members having parts respectively secured to said spaced, parallel members, said spring members forming closed spring loops offering stiff resistance to movement between said spaced, parallel members in a direction transversely of said U-shaped members, but permitting resilient movement between said members toward and away from each other.

13. In a resilient machinery base, a member for supporting a machine to be insulated, a plurality of flat, spring clips having resilient loops and secured to said supporting member, some of said clips being turned at an angle to other of said clips so as to reduce the movement of said machine in directions parallel to the plane of said supporting member but to permit its free vibration in a direction perpendicular to the plane of said supporting member, and means for supporting said spring clips.

14. In a resilient machinery base, a member for supporting a machine to be insulated and comprising a relatively heavy masonry slab portion, a plurality of flat, spring clips having resilient loops and secured to said supporting member, some of said clips being turned at an angle to other of said clips so as to reduce the movement of said machine in directions parallel to the plane of said supporting member but to permit its free vibration in a direction perpendicular to the plane of said supporting member, and means for supporting said spring clips.

BRUNO E. BALDUF.